United States Patent
Urbanski

(10) Patent No.: US 10,281,205 B2
(45) Date of Patent: May 7, 2019

(54) HEAT EXCHANGE MECHANISM FOR REMOVING CONTAMINANTS FROM A HYDROCARBON VAPOR STREAM

(71) Applicant: Nicholas F. Urbanski, Katy, TX (US)

(72) Inventor: Nicholas F. Urbanski, Katy, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 346 days.

(21) Appl. No.: 14/848,716

(22) Filed: Sep. 9, 2015

(65) Prior Publication Data

US 2016/0138863 A1     May 19, 2016

Related U.S. Application Data

(60) Provisional application No. 62/080,450, filed on Nov. 17, 2014.

(51) Int. Cl.
*F25J 3/00* (2006.01)
*F25J 3/02* (2006.01)
(Continued)

(52) U.S. Cl.
CPC ............ *F25J 3/0209* (2013.01); *B01D 3/008* (2013.01); *C10L 3/101* (2013.01); *C10L 3/102* (2013.01);
(Continued)

(58) Field of Classification Search
CPC .......... B01D 2257/504; B01D 2256/22; B01D 3/20; B01D 3/205; B01D 3/22; B01D 3/24; B01D 3/102; B01D 3/104; F25J 1/0022; F25J 1/0027; F25J 1/0047; F25J 1/0082; F25J 1/004; F25J 2200/02; F25J 2200/50; F25J 2200/74; F25J 2200/90; F25J 2205/04; F25J 2280/40; F25J 3/0209; F25J 3/0233; F25J 3/0266; F25J 3/067; F25J 3/0635;
(Continued)

(56) References Cited

U.S. PATENT DOCUMENTS

| | | | |
|---|---|---|---|
| 1,510,178 A | | 9/1924 | Lachmann |
| 2,347,957 A | * | 5/1944 | McCullough ......... F28D 1/0477 165/144 |

(Continued)

FOREIGN PATENT DOCUMENTS

| | | |
|---|---|---|
| DE | 101 06 371 A1 | 8/2002 |
| EP | 0 906 796 A1 | 4/1999 |
| WO | WO 2010/074565 A1 | 7/2010 |

OTHER PUBLICATIONS

U.S. Appl. No. 14/643,726, P.S. Northrop, filed Mar. 10, 2015.
(Continued)

*Primary Examiner* — Keith M Raymond
(74) *Attorney, Agent, or Firm* — ExxonMobil Upstream Research Company—Law Department

(57) ABSTRACT

A system for melting contaminant-laden solids that have been separated from a hydrocarbon-containing vapor stream in a hydrocarbon distillation tower, comprising at least one plate positioned where the solids form within the hydrocarbon distillation tower, hollow tubing forming an integral part of each of the at least one plate, and a heating medium disposed to flow through the hollow tubing at a higher temperature than a temperature of the solids to at least partially melt the solids.

17 Claims, 12 Drawing Sheets

(51) Int. Cl.
*C10L 3/10* (2006.01)
*B01D 3/00* (2006.01)

(52) U.S. Cl.
CPC ........... *F25J 3/0233* (2013.01); *F25J 3/0266* (2013.01); *C10L 2290/06* (2013.01); *C10L 2290/543* (2013.01); *F25J 2200/02* (2013.01); *F25J 2200/30* (2013.01); *F25J 2200/50* (2013.01); *F25J 2200/74* (2013.01); *F25J 2200/90* (2013.01); *F25J 2205/04* (2013.01); *F25J 2205/20* (2013.01); *F25J 2280/40* (2013.01); *Y02C 10/12* (2013.01)

(58) Field of Classification Search
CPC .... F28D 9/0025; F28D 9/0037; F28D 9/0071; F28F 3/00; F28F 3/12; F28F 3/15; F28F 1/105; F28F 1/12; F28F 1/08; F28F 1/14–1/38
See application file for complete search history.

(56) References Cited

U.S. PATENT DOCUMENTS

| | | | |
|---|---|---|---|
| 2,502,251 A | 3/1950 | Dennis et al. | |
| 2,650,480 A | 9/1953 | Gilmore | |
| 2,804,292 A | 8/1957 | Schilling | |
| 2,930,201 A | 3/1960 | Karwat | |
| 2,946,200 A | 7/1960 | Schilling | |
| 4,071,934 A * | 2/1978 | Zolman | B21C 23/10 165/171 |
| 4,533,372 A * | 8/1985 | Valencia | F25J 3/0209 62/629 |
| 4,579,566 A | 4/1986 | Brugerolle | 55/50 |
| 4,923,493 A | 5/1990 | Valencia et al. | 62/13 |
| 5,062,270 A | 11/1991 | Haut et al. | 62/12 |
| 5,120,338 A | 6/1992 | Potts, Jr. et al. | 62/12 |
| 5,122,174 A * | 6/1992 | Sunder | F25J 3/0409 165/166 |
| 5,265,428 A * | 11/1993 | Valencia | B01D 3/18 202/158 |
| 5,758,720 A * | 6/1998 | Moser | F28D 1/05366 165/148 |
| 5,956,971 A | 9/1999 | Cole et al. | 62/623 |
| 6,053,007 A | 4/2000 | Victory et al. | 62/619 |
| 9,746,233 B2 | 8/2017 | Briglia et al. | |
| 2003/0051501 A1 | 3/2003 | Matsushima et al. | |
| 2004/0050538 A1* | 3/2004 | Sunder | F25J 5/002 165/133 |
| 2008/0034789 A1 | 2/2008 | Fieler et al. | 62/623 |
| 2009/0266107 A1 | 10/2009 | Singh et al. | 62/617 |
| 2010/0018248 A1* | 1/2010 | Fieler | B01D 3/24 62/617 |
| 2012/0006054 A1 | 1/2012 | Keller | |
| 2012/0031144 A1 | 2/2012 | Northrop et al. | 62/617 |
| 2012/0079852 A1 | 4/2012 | Northrop et al. | 62/620 |
| 2012/0125043 A1* | 5/2012 | Cullinane | B01D 7/02 62/620 |
| 2012/0204599 A1 | 8/2012 | Northrop et al. | 62/617 |
| 2012/0279728 A1 | 11/2012 | Northrop et al. | 166/401 |
| 2013/0074541 A1 | 3/2013 | Kaminsky et al. | F25J 1/00 |
| 2013/0098105 A1 | 4/2013 | Northrop | F25J 3/0266 |
| 2014/0137599 A1 | 5/2014 | Oelfke et al. | F25J 3/069 |
| 2014/0338395 A1 | 11/2014 | Oelfke et al. | B01D 53/1418 |
| 2015/0013377 A1 | 1/2015 | Oelfke | F25J 1/0027 |
| 2015/0158796 A1 | 6/2015 | Valencia | C07C 7/05 |
| 2015/0159939 A1 | 6/2015 | Valencia | F25J 1/0022 |
| 2015/0159940 A1 | 6/2015 | Valencia et al. | F25J 1/0022 |
| 2015/0159941 A1 | 6/2015 | Valencia et al. | F25J 3/0209 |
| 2015/0159942 A1 | 6/2015 | Valencia et al. | F25J 3/0209 |
| 2015/0159943 A1 | 6/2015 | Valencia et al. | F25J 3/0233 |
| 2015/0159944 A1 | 6/2015 | Valencia et al. | F25J 3/08 |
| 2015/0159945 A1 | 6/2015 | Valencia et al. | F25J 3/08 |
| 2015/0159946 A1 | 6/2015 | Valencia | F25J 3/08 |
| 2015/0159947 A1 | 6/2015 | Valencia et al. | F25J 3/08 |

OTHER PUBLICATIONS

U.S. Appl. No. 14/661,621, J.A. Valenciam filed Mar. 18, 2015.
U.S. Appl. No. 14/688,786, R.H. Oelfke, filed Apr. 16, 2014.
U.S. Appl. No. 14/700,993, Northrop et al., filed Apr. 30, 2015.

* cited by examiner

HEAT EXCHANGE MECHANISM FOR REMOVING CONTAMINANTS FROM A HYDROCARBON VAPOR STREAM

CROSS REFERENCE TO RELATED APPLICATIONS

This application claims the priority benefit of U.S. Patent Application Ser. No. 62/080,450 filed Nov. 17, 2014, the entirety of which is incorporated by reference herein.

BACKGROUND

Fields of Disclosure

The disclosure relates generally to the field of fluid separation. More specifically, the disclosure relates to the cryogenic separation of contaminants, such as acid gas, from a hydrocarbon.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as admissions of prior art.

The production of natural gas hydrocarbons, such as methane and ethane, from a reservoir oftentimes carries with it the incidental production of non-hydrocarbon gases. Such gases include contaminants, such as at least one of carbon dioxide ("$CO_2$"), hydrogen sulfide ("$H_2S$"), carbonyl sulfide, carbon disulfide and various mercaptans. When a feed stream being produced from a reservoir includes these contaminants mixed with hydrocarbons, the stream is oftentimes referred to as "sour gas."

Many natural gas reservoirs have relatively low percentages of hydrocarbons and relatively high percentages of contaminants. Contaminants may act as a diluent and lower the heat content of hydrocarbons. Additionally, in the presence of water some contaminants can become quite corrosive.

It is desirable to remove contaminants from a stream containing hydrocarbons to produce sweet and concentrated hydrocarbons. Specifications for pipeline quality natural gas typically call for a maximum of 2-4% $CO_2$ and ¼ grain $H_2S$ per 100 scf (4 ppmv) or 5 mg/$Nm^3$ $H_2S$. Specifications for lower temperature processes such as natural gas liquefaction plants or nitrogen rejection units typically require less than 50 ppm $CO_2$.

The separation of contaminants from hydrocarbons is difficult and consequently significant work has been applied to the development of hydrocarbon/contaminant separation methods. These methods can be placed into three general classes: absorption by solvents (physical, chemical and hybrids), adsorption by solids, and distillation.

Separation by distillation of some mixtures can be relatively simple and, as such, is widely used in the natural gas industry. However, distillation of mixtures of natural gas hydrocarbons, primarily methane, and one of the most common contaminants in natural gas, carbon dioxide, can present significant difficulties. Conventional distillation principles and conventional distillation equipment are predicated on the presence of only vapor and liquid phases throughout the distillation tower. The separation of $CO_2$ from methane by distillation involves temperature and pressure conditions that result in solidification of $CO_2$ if pipeline or better quality hydrocarbon product is desired. The required temperatures are cold temperatures typically referred to as cryogenic temperatures.

Certain cryogenic distillations can overcome the above mentioned difficulties. These cryogenic distillations provide the appropriate mechanism to handle the formation and subsequent melting of solids during the separation of solid-forming contaminants from hydrocarbons. The formation of solid contaminants in equilibrium with vapor-liquid mixtures of hydrocarbons and contaminants at particular conditions of temperature and pressure takes place in a controlled freeze zone section.

A frozen solids accumulation and melt (A&M) section of the controlled freeze zone region of a distillation tower may be designed to: (a) pass vapor from the section below the A&M section to the section above; (b) accumulate the solid contaminants; (c) melt the accumulated solid contaminants; and (d) remove the melted contaminants. FIGS. 1 and 2 show a typical design for an A&M section 1, where FIG. 1 illustrates an elevational view of the A&M and FIG. 2 illustrates a cross-section view of the A&M. The A&M section 1 is disposed within the walls 2 of a controlled freeze zone section 3. The A&M section 1 is comprised of a plurality of vapor risers 4 and one or more coils of tubing 5 or heating elements arranged around the vapor risers 4. Ideally, frozen particulates fall into the interstitial space between the coils of tubing 5 and accumulate over time. At a set time, a heating medium flows through the coils of tubing 5 to melt the accumulated frozen mass. The melted mass then exits A&M section 1.

Within the confines of the design depicted in FIGS. 1 and 2, depending on the operating conditions and physical characteristics of the frozen particles, such particles may not fall into and accumulate in the interstitial spacing between the tube coils. Rough surfaces and surface imperfections serve as a nucleation points for particle deposition and promote agglomeration with additional particles. Frozen particles may accumulate on, but not limited to: (a) the walls of the tubes in the coils of tubing 5; (b) the walls of the vapor risers 4; (c) the covers of the vapor risers 4; (d) surface imperfections on the wall 2 of the A&M section 1; and (e) other internal structures in the controlled freeze zone section 3 immediately above the A&M section 1. If not in contact with or exposed to the coils of tubing, the accumulated frozen mass may be effectively removed from the melting process, reducing its effectiveness.

Therefore, a need exists for improved technology to effectively melt the accumulated frozen mass in a controlled freeze zone unit. There is also a need for improved technology in a controlled freeze zone unit that reduces uneven collection and agglomeration of frozen particulates within the desired accumulation region. Further, there is a need for improved technology in a controlled freeze zone unit that reduces frozen particulate accumulation outside of the designated region.

SUMMARY

The present disclosure provides a means to selectively melt contaminant-laden solids or semi-solids in a hydrocarbon distillation process.

In one aspect, the disclosure includes a system for melting contaminant-laden solids that have been separated from a hydrocarbon-containing vapor stream in a hydrocarbon distillation tower, comprising at least one plate positioned where the solids form within the hydrocarbon distillation tower, hollow tubing forming an integral part of each of the at least one plate, and a heating medium disposed to selectively flow through the hollow tubing at a higher temperature than a temperature of the solids to at least partially melt the solids.

In another aspect, a method is disclosed for separating a feed stream in a distillation tower comprising maintaining a controlled freeze zone section in the distillation tower that receives a freezing zone liquid stream to form a solid and a hydrocarbon-enriched vapor stream in the controlled freeze zone section, melting the solid using a heat exchange mechanism, wherein melting includes flowing a heating medium through a hollow tubing integrally disposed in a plate positioned where the solids form within the controlled freeze zone section, wherein the heating medium is at a higher temperature than the temperature of the solid, collecting the solid that has been at least partially melted by the heat exchange mechanism, and separating the at least partially melted solid from the hydrocarbon-enriched vapor stream.

In still another aspect, the disclosure includes a method for producing hydrocarbons comprising maintaining a controlled freeze zone section in the distillation tower that receives a freezing zone liquid stream to form a solid and a hydrocarbon-enriched vapor stream in the controlled freeze zone section, melting at least a portion of the solid using a heat exchange mechanism, wherein melting comprises heating a heating medium to a higher temperature than the temperature of the solid, flowing the heating medium through a hollow tubing integrally disposed in at least one plate positioned where the solid forms within the controlled freeze zone section, collecting the solid that has been at least partially melted by the heat exchange mechanism, disposing of the at least partially melted solid, and passing the hydrocarbon-enriched vapor stream from the distillation tower.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 2:
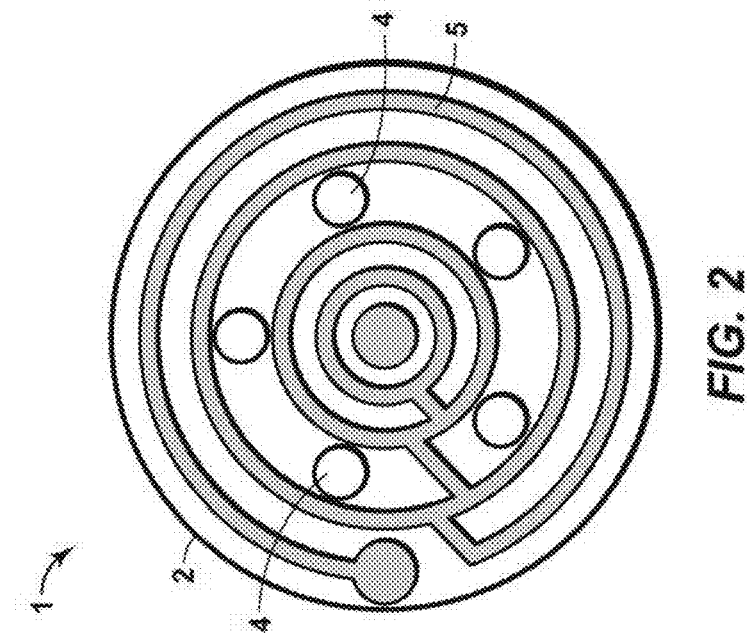
FIG. 2 is a cross-section of the A&M section in FIG. 1.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

As referenced in this application, the terms "stream," "gas stream," "vapor stream," and "liquid stream" refer to different stages of a feed stream as the feed stream is processed in a distillation tower that separates methane, the primary hydrocarbon in natural gas, from contaminants. Although the phrases "gas stream," "vapor stream," and "liquid stream," refer to situations where a gas, vapor, and liquid is mainly present in the stream, respectively, there may be other phases also present within the stream. For example, a gas may also be present in a "liquid stream." In some instances, the terms "gas stream" and "vapor stream" may be used interchangeably.

The disclosure relates to a system and method for removing contaminants from a hydrocarbon stream. FIGS. 1-19 of the disclosure display various aspects of the system and method.

The system and method may separate a feed stream having methane and contaminants. The system may comprise a distillation tower 104, 204 (FIGS. 3-6). The distillation tower 104, 204 may separate the contaminants from the methane.

The distillation tower 104, 204 may be separated into three functional sections: a lower section 106, a middle controlled freeze zone section 108, and an upper section 110. The distillation tower 104, 204 may incorporate three functional sections when the upper section 110 is needed and/or desired.

The distillation tower 104, 204 may incorporate only two functional sections when the upper section 110 is not needed and/or desired. For examples, in embodiments where the distillation tower does not include an upper section 110, a portion of vapor leaving the middle controlled freeze zone section 108 may be condensed in a condenser 122 and returned as a liquid stream via a spray assembly 129. Moreover, in such embodiments FIG. 3 may be modified such that lines 18 and 20 may be eliminated, elements 124 and 126 may be one and the same, and elements 150 and 128 may be one and the same. The stream in line 14, now taking the vapors leaving the middle controlled freeze section 108, directs these vapors to the condenser 122.

Returning to FIGS. 3-6, the lower section 106 may be referred to as a stripper section. The middle controlled freeze zone section 108 may be referred to as a controlled freeze zone section. The upper section 110 may be referred to as a rectifier section.

Figure 3:
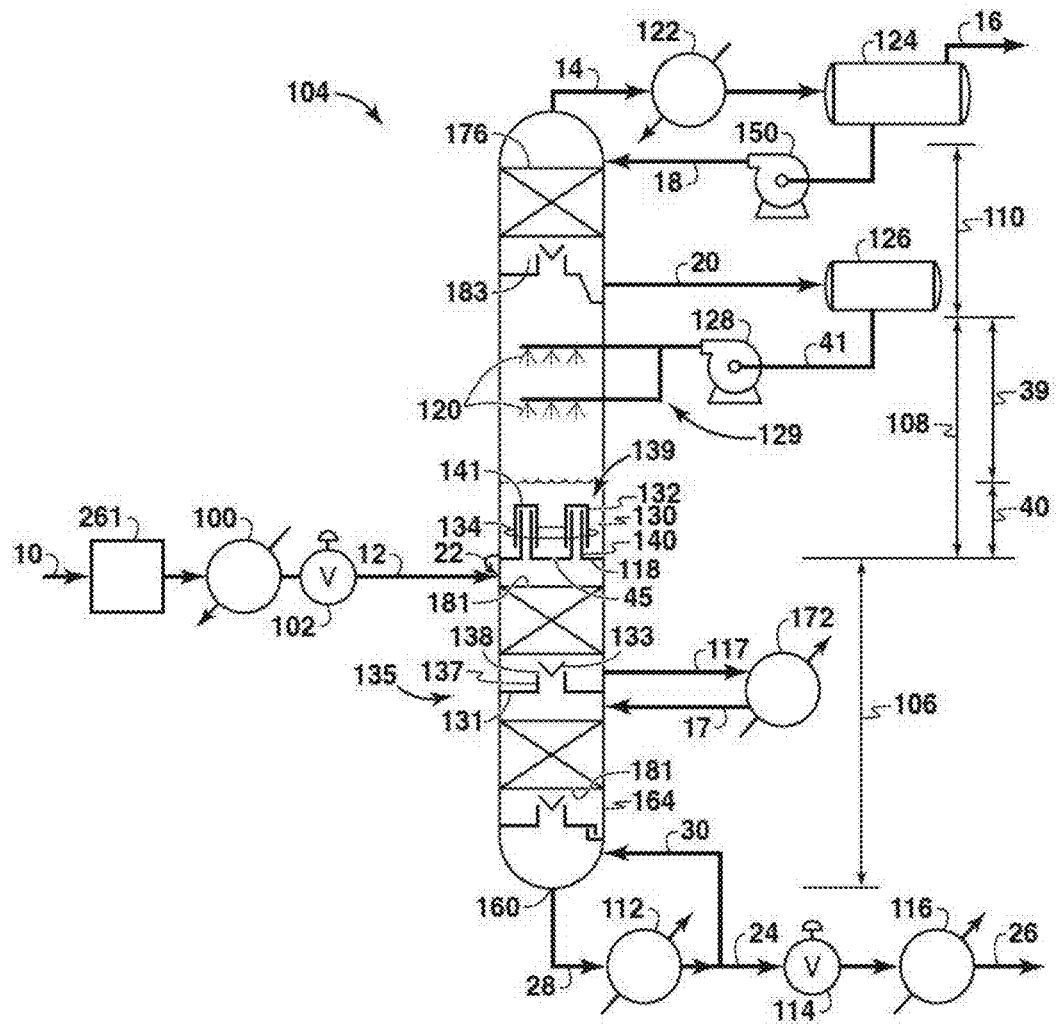
FIG. 3 is a schematic diagram of a distillation tower with sections within a single vessel.
Figure 5:
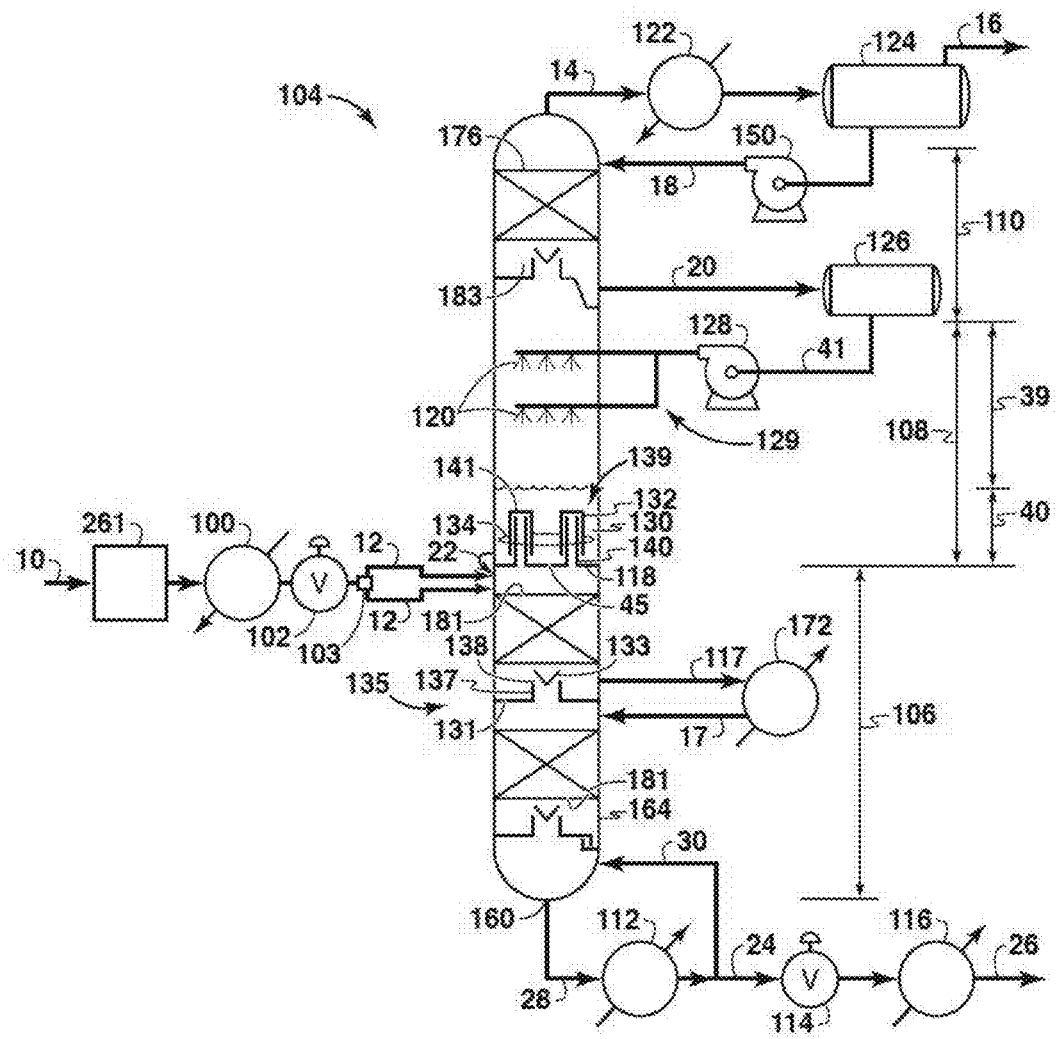
FIG. 5 is a schematic diagram of a tower with sections within a single vessel.

The sections of the distillation tower 104 may be housed within a single vessel (FIGS. 3 and 5). For example, the lower section 106, the middle controlled freeze zone section 108, and the upper section 110 may be housed within a single vessel 164.

Figure 4:
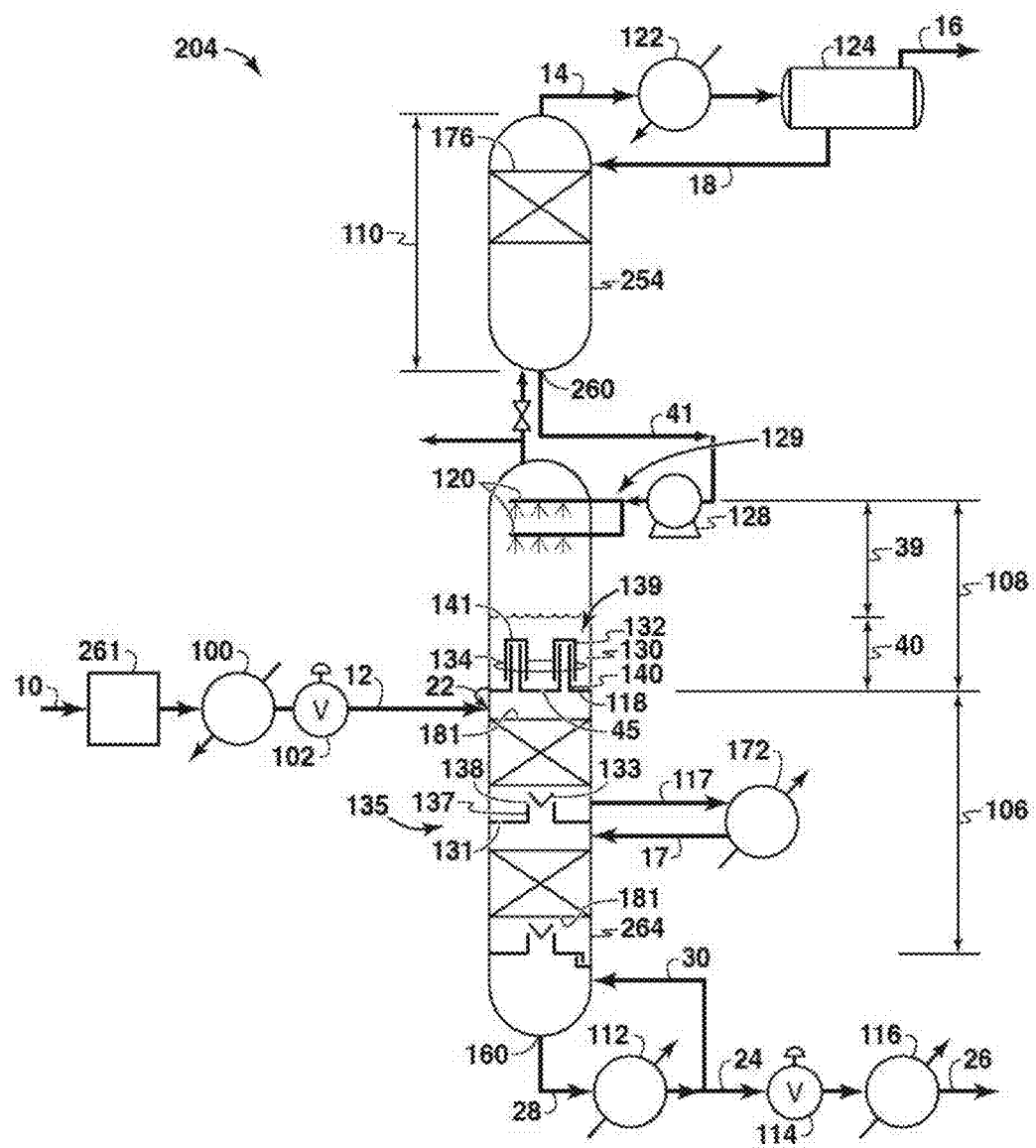
FIG. 4 is a schematic diagram of a tower with sections within multiple vessels.
Figure 6:
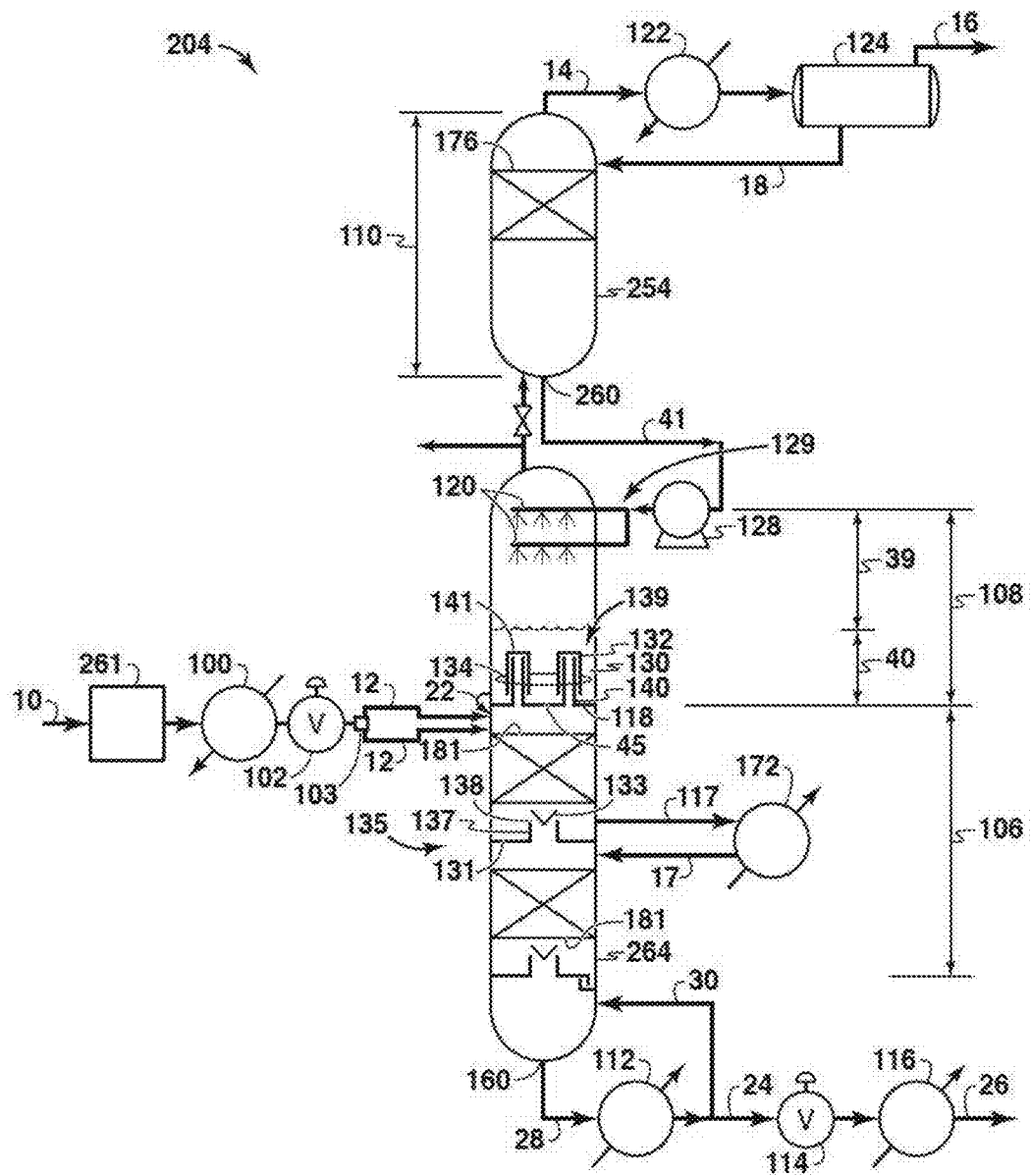
FIG. 6 is a schematic diagram of a tower with sections within multiple vessels.

In some embodiments, the sections of the distillation tower 204 may be housed within a plurality of vessels to form a split-tower configuration (FIGS. 4 and 6). Each of the vessels may be separate from the other vessels. Piping and/or another suitable mechanism may connect one vessel to another vessel. In this instance, the lower section 106, middle controlled freeze zone section 108, and upper section 110 may be housed within two or more vessels. For example, as shown in FIGS. 4 and 6, the upper section 110 may be housed within a single vessel 254 and the lower and middle controlled freeze zone sections 106, 108 may be housed within a single vessel 264. When this is the case, a liquid stream exiting the upper section 110 may exit through a liquid outlet bottom 260. The liquid outlet bottom 260 is at the bottom of the upper section 110. Although not shown, each of the sections may be housed within its own separate vessel, or one or more section may be housed within separate vessels, or the upper and middle controlled freeze zone sections may be housed within a single vessel and the lower section may be housed within a single vessel, etc. When sections of the distillation tower are housed within vessels, the vessels may be disposed in many possible orientations, such as side-by-side along a horizontal line and/or above each other along a vertical line.

The split-tower configuration may be beneficial in situations where the height of the distillation tower, motion considerations, and/or transportation issues, such as for remote locations, need to be considered. This split-tower configuration allows for the independent operation of one or more sections. For example, when the upper section is housed within a single vessel and the lower and middle controlled freeze zone sections are housed within another single vessel, independent generation of reflux liquids using a substantially contaminant-free, largely hydrocarbon stream from a packed gas pipeline or an adjacent hydrocarbon line, may occur in the upper section. The reflux may be used to cool the upper section, establish an appropriate temperature profile in the upper section, and/or build up liquid inventory at the bottom of the upper section to serve as an initial source of spray liquids for the middle controlled freeze zone section. Moreover, the middle controlled freeze zone and lower sections may be independently prepared by (a) chilling the feed stream, (b) feeding the chilled feed stream to the optimal location in the lower section or in the middle controlled freeze zone section, (c) generating liquids for the lower and the middle controlled freeze zone sections, and (d) disposing of the vapors off the middle controlled freeze zone section if the vapors are off specification with too high a contaminant content. Also, liquid from the upper section may be intermittently or continuously sprayed, which builds up liquid level in the bottom of the middle controlled freeze zone section and reduces the contaminant content in the middle controlled freeze zone section to a near steady state level. In this manner the two vessels may be connected to send the vapor stream from the middle controlled freeze zone section to the upper section, continuously spraying liquid from the bottom of the upper section into the middle controlled freeze zone section and stabilizing operations into steady state conditions. The split tower configuration may use a sump of the upper section as a liquid receiver for the pump 128, thereby obviating the need for a liquid receiver 126 in FIGS. 3 and 5.

The system may also include a heat exchanger 100 (FIGS. 3-6). The feed stream 10 may enter the heat exchanger 100 before entering the distillation tower 104, 204. The feed stream 10 may be cooled within the heat exchanger 100. The heat exchanger 100 helps drop the temperature of the feed stream 10 to a level suitable for introduction into the distillation tower 104, 204.

The system may include an expander device 102 (FIGS. 3-6). The feed stream 10 may enter the expander device 102 before entering the distillation tower 104, 204. The feed stream 10 may be expanded in the expander device 102 after exiting the heat exchanger 100. The expander device 102 helps drop the temperature of the feed stream 10 to a level suitable for introduction into the distillation tower 104, 204. The expander device 102 may be any suitable device, such as a valve. If the expander device 102 is a valve, the valve may be any suitable valve that aids in cooling the feed stream 10 before it enters the distillation tower 104, 204. For example, the valve 102 may comprise a Joule-Thompson (J-T) valve.

The system may include a feed separator 103 (FIGS. 5-6). The feed stream enters the feed separator before entering the distillation tower 104, 204. The feed separator separates a feed stream having a mixed liquid and vapor stream into a liquid stream and a vapor stream. Lines 12 extend from the feed separator to the distillation tower 104, 204. One of the lines 12 may receive the vapor stream from the feed separator. Another one of the lines 12 may receive the liquid stream from the feed separator. Each of the lines 12 may extend to the same and/or different sections (i.e. middle controlled freeze zone, and lower sections) of the distillation tower 104, 204. The expander device 102 may or may not be downstream of the feed separator 103. The expander device 102 may comprise a plurality of expander devices 102 such that each line 12 has an expander device 102.

The system may include a dehydration unit 261 (FIGS. 3-6). The feed stream 10 may enter the dehydration unit 261 before entering the distillation tower 104, 204. The feed stream 10 enters the dehydration unit 261 before entering the heat exchanger 100 and/or the expander device 102. The dehydration unit 261 removes water from the feed stream 10 to prevent water from later presenting a problem in the heat exchanger 100, expander device 102, feed separator 103, or distillation tower 104, 204. The water can present a problem by forming a separate water phase (i.e., ice and/or hydrate) that plugs lines, equipment or negatively affects the distillation process. The dehydration unit 261 dehydrates the feed stream to a dew point sufficiently low to ensure a separate water phase will not form at any point downstream during the rest of the process. The dehydration unit may be any suitable dehydration mechanism, such as a molecular sieve or a glycol dehydration unit.

The system may include a filtering unit (not shown). The feed stream 10 may enter the filtering unit before entering the distillation tower 104, 204. The filtering unit may remove undesirable contaminants from the feed stream before the feed stream enters the distillation tower 104, 204. Depending on what contaminants are to be removed, the filtering unit may be before or after the dehydration unit 261 and/or before or after the heat exchanger 100.

The system may include a line 12 (FIGS. 3-6). The line may be referred to as an inlet channel 12. The feed stream 10 may be introduced into the distillation tower 104, 204 through the line 12. The line 12 may extend to the lower section 106 or the middle controlled freeze zone section 108 of the distillation tower 104, 204. For example, the line 12 may extend to the lower section 106 such that the feed stream 10 may enter the lower section 106 of the distillation tower 104, 204 (FIGS. 3-6). The line 12 may directly or indirectly extend to the lower section 106 or the middle controlled freeze zone section 108. The line 12 may extend to an outer surface of the distillation tower 104, 204 before entering the distillation tower 104, 204.

If the system includes the feed separator 103 (FIGS. 5-6), the line 12 may comprise a plurality of lines 12. Each line extends from the feed separator to a specific portion of the distillation tower 104, 204.

The lower section 106 is constructed and arranged to separate the feed stream 10 into an enriched contaminant bottom liquid stream (i.e., liquid stream) and a freezing zone vapor stream (i.e., vapor stream). The lower section 106 separates the feed stream at a temperature and pressure at which no solids form. The liquid stream may comprise a greater quantity of contaminants than of methane. The vapor stream may comprise a greater quantity of methane than of contaminants. In any case, the vapor stream is lighter than the liquid stream. As a result, the vapor stream rises from the lower section 106 and the liquid stream falls to the bottom of the lower section 106.

The lower section 106 may include and/or connect to equipment that separates the feed stream. The equipment may comprise any suitable equipment for separating methane from contaminants, such as one or more packed sections 181, or one or more distillation trays with perforations, downcomers, and weirs (FIGS. 3-6).

The equipment may include components that apply heat to the stream to form the vapor stream and the liquid stream. For example, the equipment may comprise a first reboiler 112 that applies heat to the stream. The first reboiler 112 may be located outside of the distillation tower 104, 204. The equipment may also comprise a second reboiler 172 that applies heat to the stream. The second reboiler 172 may be located outside of the distillation tower 104, 204. Line 117 may lead from the distillation tower to the second reboiler 172. Line 17 may lead from the second reboiler 172 to the distillation tower. Additional reboilers, set up similarly to the second reboiler described above, may also be used.

The first reboiler 112 applies heat to the liquid stream that exits the lower section 106 through a liquid outlet 160 of the lower section 106. The liquid stream travels from the liquid outlet 160 through line 28 to reach the first reboiler 112 (FIGS. 3-6). The amount of heat applied to the liquid stream by the first reboiler 112 can be increased to separate more methane from contaminants. The more heat applied by the reboiler 112 to the stream, the more methane can be separated from the liquid contaminants, though more contaminants will also be vaporized.

The first reboiler 112 may also apply heat to the stream within the distillation tower 104, 204. Specifically, the heat applied by the first reboiler 112 warms up the lower section 106. This heat travels up the lower section 106 and supplies heat to warm solids entering a melt tray assembly 139 (FIGS. 3-6) of the middle controlled freeze zone section 108 so that the solids form a liquid and/or slurry mix.

The second reboiler 172 applies heat to the stream within the lower section 106. This heat is applied closer to the middle controlled freeze zone section 108 than the heat applied by the first reboiler 112. As a result, the heat applied by the second reboiler 172 reaches the middle controlled freeze zone section 108 faster than the heat applied by the first reboiler 112. The second reboiler 172 also helps with energy integration.

The equipment may include one or more chimney assemblies 135 (FIGS. 3-6). While falling to the bottom of the lower section 106, the liquid stream may encounter one or more of the chimney assemblies 135.

Each chimney assembly 135 includes a chimney tray 131 that collects the liquid stream within the lower section 106. The liquid stream that collects on the chimney tray 131 may be fed to the second reboiler 172. After the liquid stream is heated in the second reboiler 172, the stream may return to the middle controlled freeze zone section 108 to supply heat to the middle controlled freeze zone section 108 and/or the melt tray assembly 139. Unvaporized portions of the stream exiting the second reboiler 172 may be fed back to the distillation tower 104, 204 below the chimney tray 131. Vapor stream exiting the second reboiler 172 may be routed under or above the chimney tray 131 when the vapor stream enters the distillation tower 104, 204.

The chimney tray 131 may include one or more chimneys 137. The chimney 137 serves as a channel that the vapor stream in the lower section 106 traverses. The vapor stream travels through an opening in the chimney tray 131 at the bottom of the chimney 137 to the top of the chimney 137. The opening is closer to the bottom of the lower section 106 than it is to the bottom of the middle controlled freeze zone section 108. The top is closer to the bottom of the middle controlled freeze zone section 108 than it is to the bottom of the lower section 106.

Each chimney 137 has attached to it a chimney cap 133. The chimney cap 133 covers a chimney top opening 138 of the chimney 137. The chimney cap 133 prevents liquid from entering the chimney 137 directly from the section above the chimney 137. The vapor stream exits the chimney assembly 135 via the chimney top opening 138.

After falling to the bottom of the lower section 106, the liquid stream exits the distillation tower 104, 204 through the liquid outlet 160. The liquid outlet 160 is within the lower section 106 (FIGS. 3-6). The liquid outlet 160 may be located at the bottom of the lower section 106.

After exiting through the liquid outlet 160, the feed stream may travel via line 28 to the first reboiler 112. The feed stream may be heated by the first reboiler 112 and vapor may then re-enter the lower section 106 through line 30. Unvaporized liquid may continue out of the distillation process via line 24.

The system may include an expander device 114 (FIGS. 3-6). After entering line 24, the heated liquid stream may be expanded in the expander device 114. The expander device 114 may be any suitable device, such as a valve. Any suitable valve may be used, such as a J-T valve.

The system may include a heat exchanger 116 (FIGS. 3-6). The liquid stream heated by the first reboiler 112 may be cooled or heated by the heat exchanger 116. The heat exchanger 116 may be a direct heat exchanger or an indirect heat exchanger. The heat exchanger 116 may comprise any suitable heat exchanger and may output a discharge stream 26.

The vapor stream in the lower section 106 rises from the lower section 106 to the middle controlled freeze zone section 108. The middle controlled freeze zone section 108 is maintained to receive a freezing zone liquid stream to form the solid and the vapor stream (i.e., hydrocarbon-enriched vapor stream) in the middle controlled freeze zone section 108. The middle controlled freeze zone section 108 is constructed and arranged to separate the feed stream 10 introduced into the middle controlled freeze zone section into a solid and a vapor stream. The solid and the vapor stream are formed in the middle controlled freeze zone section 108 when the freezing zone liquid stream is injected into the middle controlled freeze zone section 108 at a temperature and pressure at which the solid and vapor stream form. The solid may be comprised more of contaminants than of methane. The vapor stream may comprise more methane than contaminants.

Figure 7:
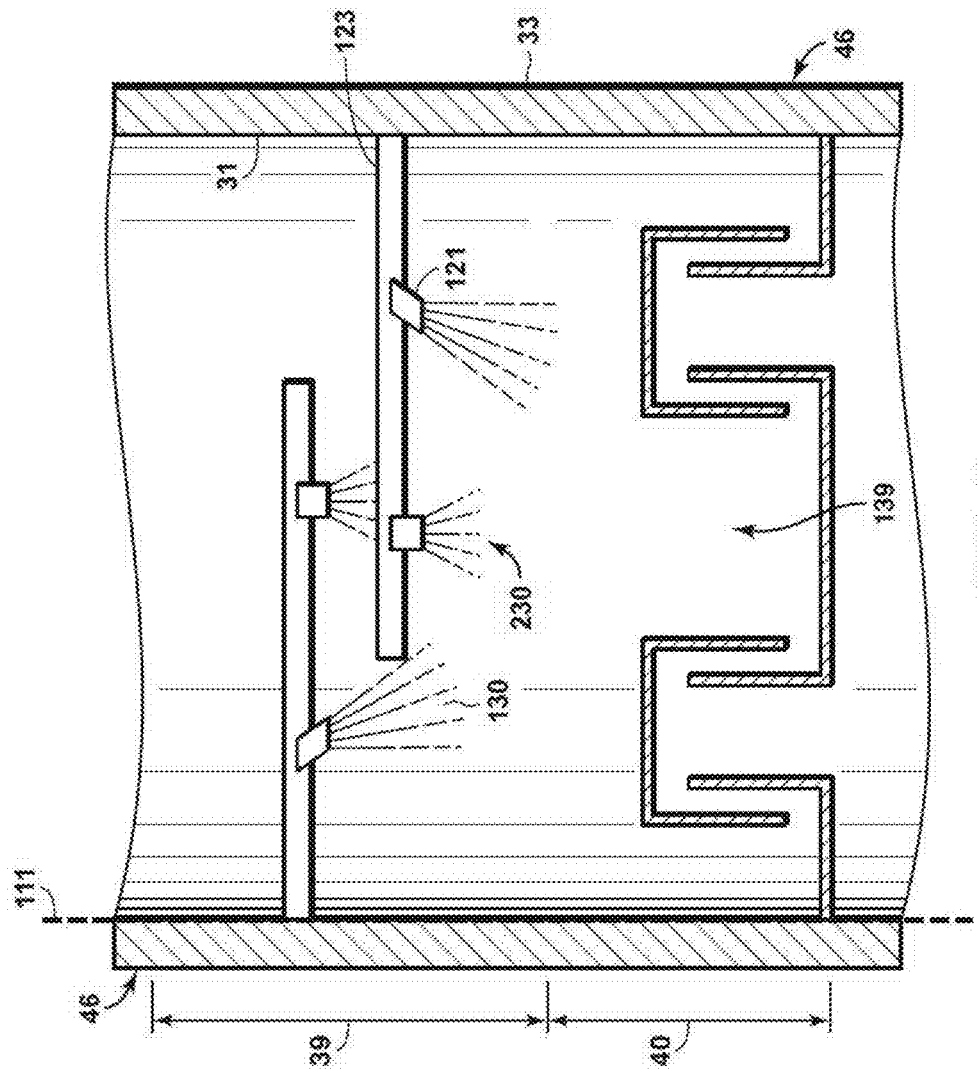
FIG. 7 is a detailed schematic diagram of a portion of any of the towers of FIGS. 3-6.

The middle controlled freeze zone section 108 includes a lower section 40 and an upper section 39 (FIG. 7). The lower section 40 is below the upper section 39. The lower section 40 directly abuts the upper section 39. The lower section 40 is primarily but may not exclusively be a heating section of the middle controlled freeze zone section 108. The upper section 39 is primarily but may not exclusively be a cooling section of the middle controlled freeze zone section 108. The temperature and pressure of the upper section 39 are chosen so that the solid can form in the middle controlled freeze zone section 108.

The middle controlled freeze zone section 108 may comprise a melt tray assembly 139 that is maintained in the middle controlled freeze zone section 108 (FIGS. 3-7). The melt tray assembly 139 is within the lower section 40 of the middle controlled freeze zone section 108. The melt tray assembly 139 is not within the upper section 39 of the middle controlled freeze zone section 108.

The melt tray assembly 139 is constructed and arranged to melt a solid formed in the middle controlled freeze zone section 108. When the warm vapor stream rises from the lower section 106 to the middle controlled freeze zone section 108, the vapor stream immediately encounters the melt tray assembly 139 and supplies heat to melt the solid. The melt tray assembly 139 may comprise at least one of a melt tray 118, a bubble cap 132, a liquid 130, and a heat exchange mechanism(s) 134.

The melt tray 118 may collect a liquid and/or slurry mix. The melt tray 118 divides at least a portion of the middle controlled freeze zone section 108 from the lower section 106. The melt tray 118 is at the bottom 45 of the middle controlled freeze zone section 108.

One or more bubble caps 132 may act as a channel for the vapor stream rising from the lower section 106 to the middle controlled freeze zone section 108. The bubble cap 132 may provide a path for the vapor stream that forces the vapor stream up the riser 140 and then down and around the riser 140 to the melt tray 118. The riser 140 is covered by a cap 141. The cap 141 forms a passage around the riser 140 through which the vapor stream flows. The vapor stream's traversal through the bubble cap 132 allows the vapor stream to transfer heat to the liquid 130 within the melt tray assembly 139.

One or more heat exchange mechanisms 134 may further heat up the liquid 130 to facilitate melting of the solids into a liquid and/or slurry mix. The heat exchange mechanism(s) 134 may be located anywhere within the melt tray assembly 139. For example, as shown in FIGS. 3-7, a heat exchange mechanism 134 may be located around the bubble caps 132. The heat mechanism 134 may be any suitable mechanism, such as a heat coil. The heat source of the heat exchange mechanism 134 may be any suitable heat source.

Figure 8:
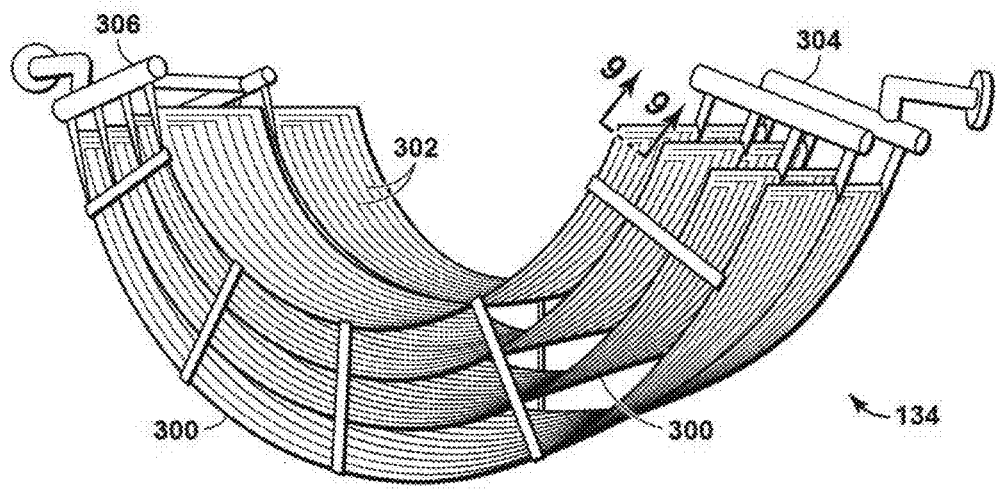
FIG. 8 is a perspective view of a heat exchange mechanism.
Figures 9, 10:
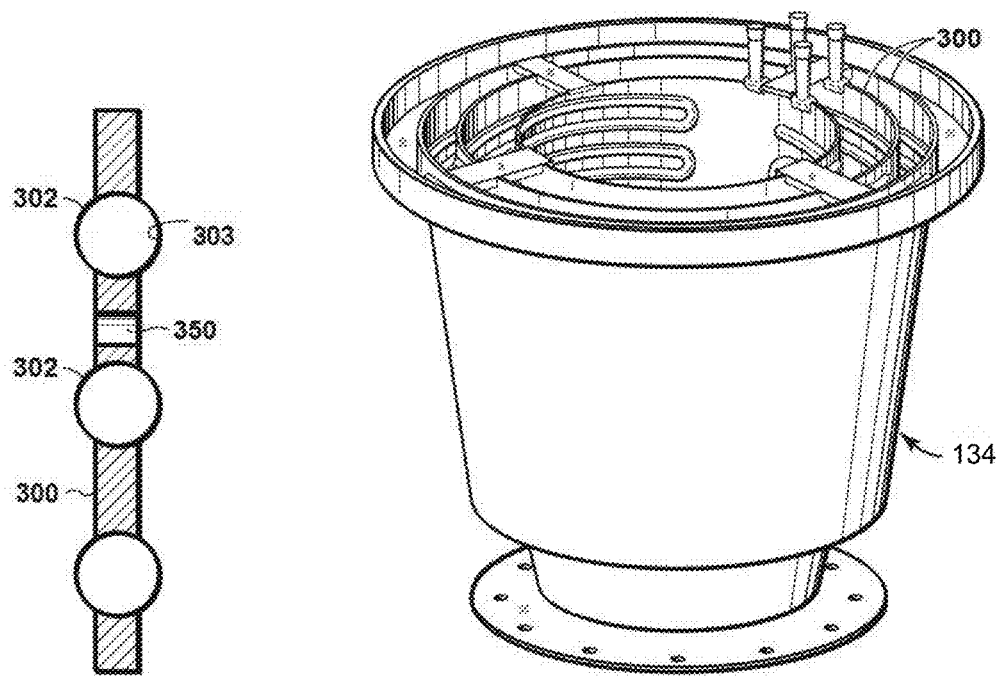
FIG. 9 is a cross-section of the heat exchange mechanism of FIG. 8 taken along line 9-9.
FIG. 10 is a perspective view of another heat exchange mechanism.

In one aspect of the disclosure shown in FIG. 8, the heat exchange mechanism 134 is a plurality of plates 300 having hollow tubing forming an integral part of the plates, e.g., in a parallel, coiled, helical, or serpentine configuration (FIG. 9). The tubing 302 is attached to an inlet manifold 304 that directs a heating medium into the tubing 302. The heating medium exits the tubing through an outlet manifold 306. The heating medium may be any fluid, either liquid or vapor, that is warmer than the fluid or solid to be heated. As a liquid, the heating medium may be water, a hydrocarbon, or a mixture thereof. The inner surface 303 of tubing 302 may be smooth, or alternatively may comprise an irregular texture or shape to enhance fluid flow and/or heat exchange characteristics of the tubing, e.g., ridges, bumps, channels, slots, grooves, holes, other equivalent structures, or various combinations thereof.

In the aspect shown in FIG. 8, the substantially concentric plates 300 are curved to fit within the middle controlled freeze zone section 108. The curvature of plates 300 can be optimized to meet required accumulation cross-sectional area and volume, as well as to accommodate the risers 140 (FIGS. 3-7). For example, FIG. 10 shows a heat exchange mechanism 134 where the concentric plates 300 are substantially fully circular in shape, and are designed to fit around a riser (FIGS. 3-7). Although the plates in FIGS. 8 and 10 are shown as being substantially parallel to each other, it is possible to vary the angle of the plates with respect to each other and the vessel walls to meet the required accumulation cross-sectional area and volume. Alternatively, the heat exchange mechanism may be modified to include a single plate that is formed in a spiral shape.

Figure 11:
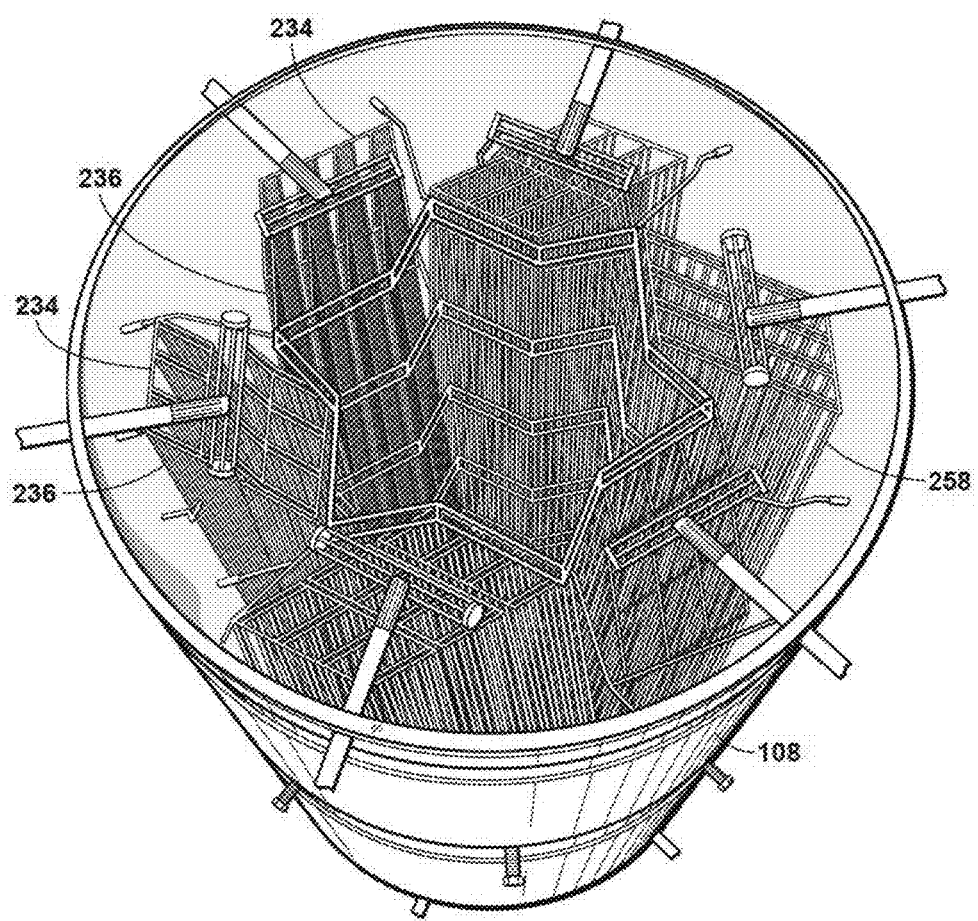
FIG. 11 is a perspective view of another heat exchange mechanism.

Another aspect of the disclosure is shown in FIG. 11, in which a plurality of individual, interconnected coil-in-plate heat exchangers 234 are disposed within the middle controlled freeze zone section 108. As with the heat exchangers shown in FIGS. 8 and 10, heat exchangers 234 include a plurality of plates 236 and tubing 258 integral with the plates and arranged in a substantially parallel, coiled, or serpentine configuration, as shown in FIG. 9. The heat exchangers 234 may be smaller or larger in size than the heat exchangers shown in FIGS. 8 and 10. The heat exchangers 234 may be designed to operate all at once or in any combination, with the heating medium directed into a specified combination of the heat exchangers 234 to direct melting of the accumulated solid material collected between the plates thereof. As with the aspects shown in FIGS. 8 and 10, the angle of the plates may be varied with respect to each other and the vessel walls to meet the required accumulation cross-sectional area and volume.

Figure 1:
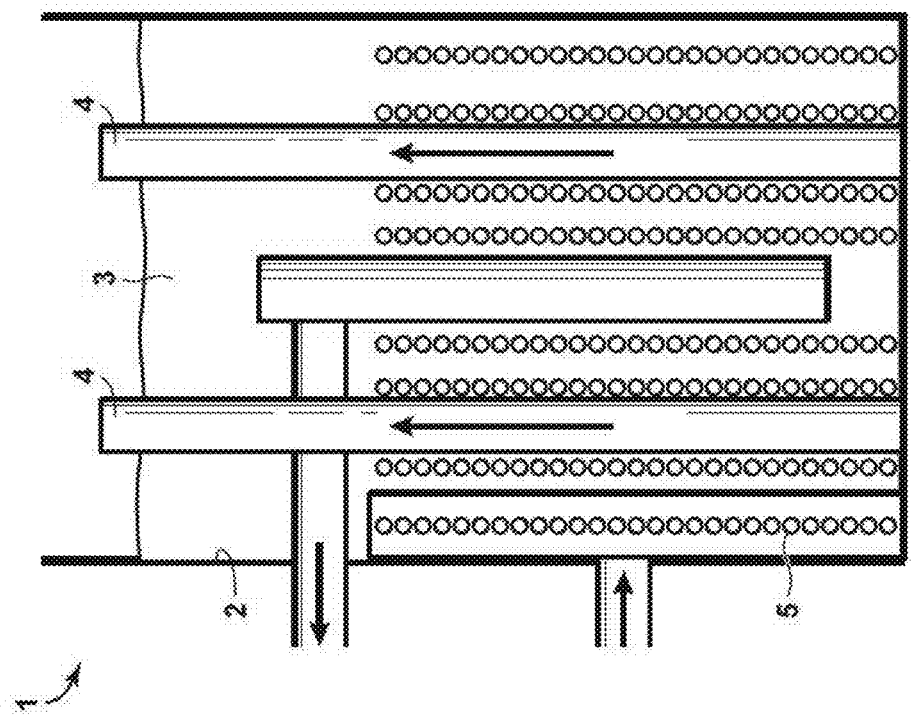
FIG. 1 is a top elevational view of an accumulation and melt (A&M) section in a distillation tower.
Figure 12:
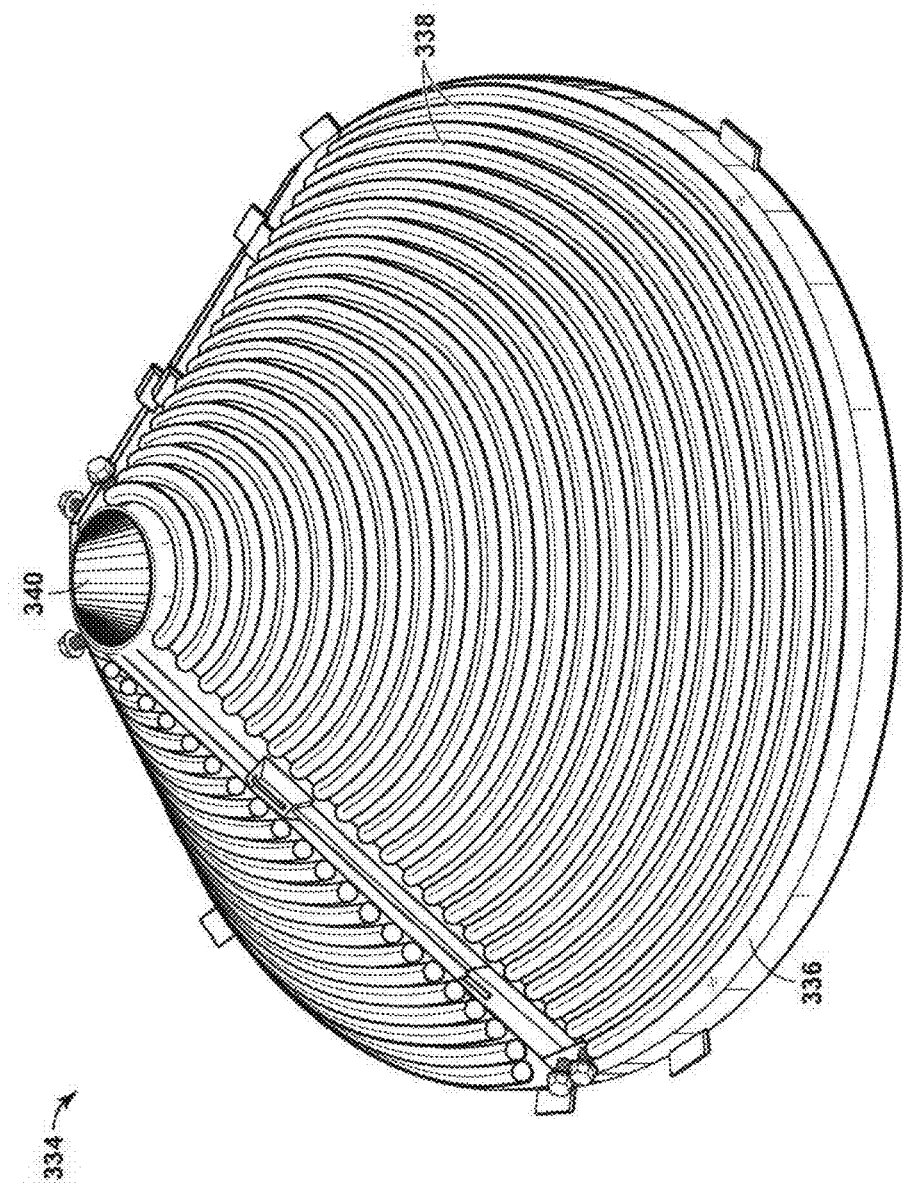
FIG. 12 is a perspective view of another heat exchange mechanism.

Another aspect of the disclosure is shown in FIG. 12, in which a heat exchanger 334 includes a conical or frusto-conical plate 336. As with the heat exchangers shown in FIGS. 8 and 10, plate 336 has tubing 338 disposed integrally therewith and arranged in a substantially parallel, coiled, or serpentine configuration, as shown in FIG. 9. The conical or frusto-conical shape of plate 336 allows for melted accumulation to flow downward across the coils to the melt tray 118 (FIG. 1). While FIG. 12 depicts tubing 338 disposed latitudinally on or in plate 336, the tubing 338 may alternatively be disposed helically on or in plate 336 allowing for the melted accumulation to flow not only downward across the tubing, but also downward along the length of the tubing in a generally spiral or helical direction. The conical or frusto-conical overall shape of heat exchanger 334 provides a minimal cross-section for accumulation of solid material at its apex 340. In contrast, the remainder of heat exchanger 334 provides a substantial cross-sectional surface area for solids accumulation that is free of other internal tower structures on which solids would prematurely stick, accumulate, and form large clumps that would interfere with the desired operation of the middle controlled freeze zone section 108.

If plate 336 is frusto-conical, a single riser may be disposed through the opening at the apex 340. Upward flowing vapor may be funneled on the side of the plates opposite of that accumulating the solids into the vapor riser. By only using one vapor riser with heat exchanger 334, the surface area available for premature solids accumulation away from plate 336 is reduced. Optionally, or additionally, if multiple risers are desired to be used, one or more heat exchangers 334 may be deployed around each riser.

Regarding the aspects of the disclosure shown in FIGS. 8, 10, and 11, passages or openings such as slots or holes 350 (FIG. 9) may be incorporated in or through the plates 300 (FIG. 9), 236 (FIG. 11) to allow the equilibration of the liquid within the volume occupied by the heat exchanger(s) 134 (FIGS. 8 and 10) and 234 (FIG. 11) to optimize heat transfer and promote even melting of the collected frozen solids.

According to the disclosed aspects, the risers 140 may be arranged to provide improved coverage of the vapor within the volume above the middle controlled freeze zone section 108. A plurality of risers provide an additional means to effectively introduce heat to the part of the tower above the middle controlled freeze zone section 108 by passing vapor warmer than the frozen particulates captured in the middle controlled freeze zone section. Increasing the cross-sectional area and volume influenced by the upflowing vapor exiting the risers is expected to decrease the tendency of frozen particulates from sticking to and agglomerating on surfaces in this portion of the tower by introducing a sweeping effect in this region. Disrupting the formation of frozen particulate structures in this section allows for their formation, as designed, in the middle controlled freeze zone section between the plates of the heat exchange mechanism 134, 234, 334.

Figure 13A:
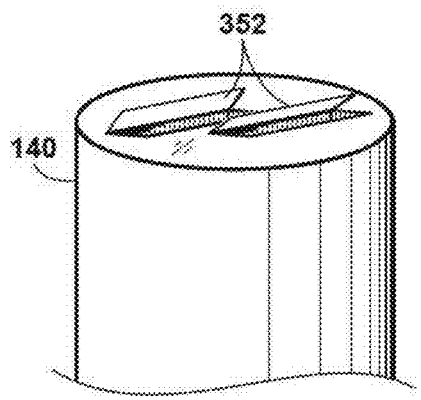
FIGS. 13A & 13B are perspective views of risers used with the heat exchange mechanisms disclosed herein.
Figure 13B:
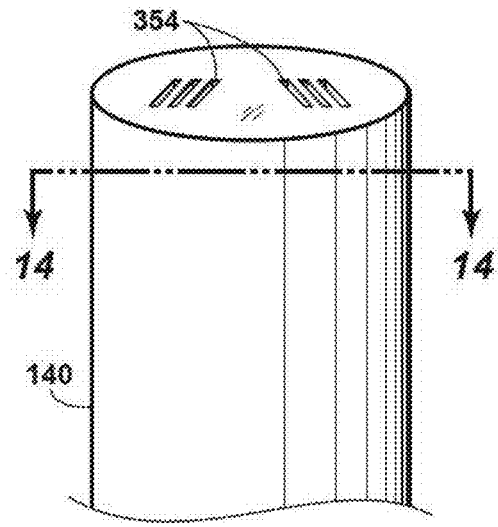
Figure 14:
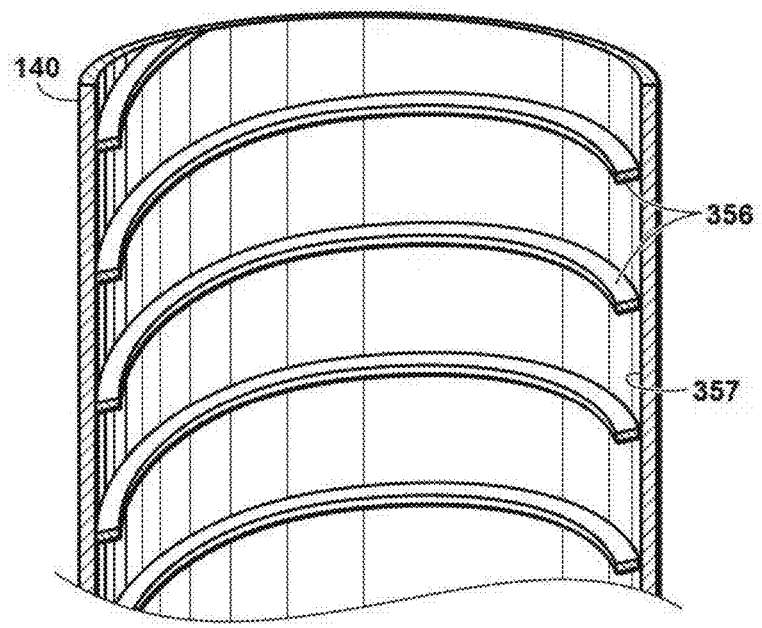
FIG. 14 is a cutaway view of a riser in FIG. 13 taken along line 14-14.
Figure 15:
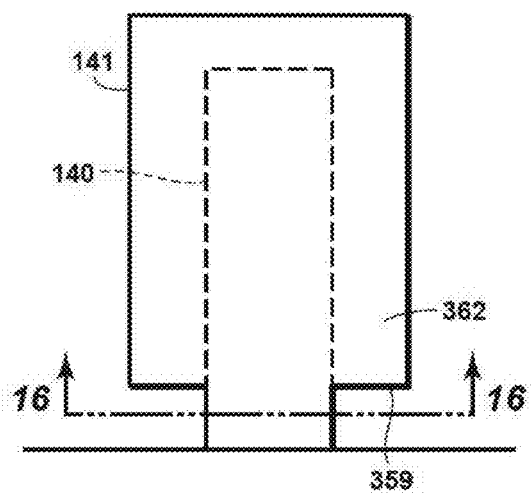
FIG. 15 is a side view of a riser and cap according to the disclosure.
Figure 16:
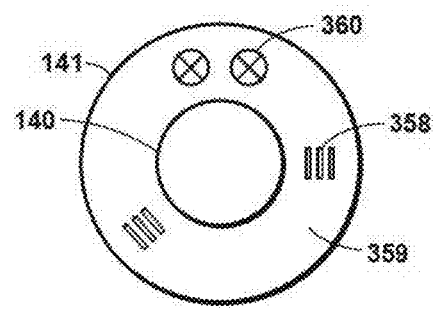
FIG. 16 is a sectional view taken along line 16-16 in FIG. 15.

Various methods may be used to vary the flow patterns of vapor exiting the riser or risers 140. For example, and as previously discussed, a plurality of risers may be employed. For example, adjacent risers 140 may have varying heights with respect to each other. Optionally or additionally, as shown in FIG. 13A flow pattern inducers such as louvers 352 or as shown in FIG. 13B directional slots 354 may be disposed on or in the risers. Optionally or additionally, devices or structures may be disposed inside the riser to cause the vapor exiting the riser to swirl or otherwise exhibit characteristics of turbulent flow. FIG. 14 depicts helical slats 356 on the inner wall 357 of riser 140 that cause the vapor in the riser to move in a swirling motion as it exits the riser. Optionally or additionally, the cap 141 may substantially completely enclose a volume around the riser, as shown in FIG. 15. The bottom surface 359 of the cap 141 may include flow restrictors such as slots 358 or valves 360 to direct or otherwise control vapor exiting the riser (FIG. 16). Additionally and alternatively, the flow restrictors may be disposed along the lower sides 362 of the cap 141.

Figure 17:
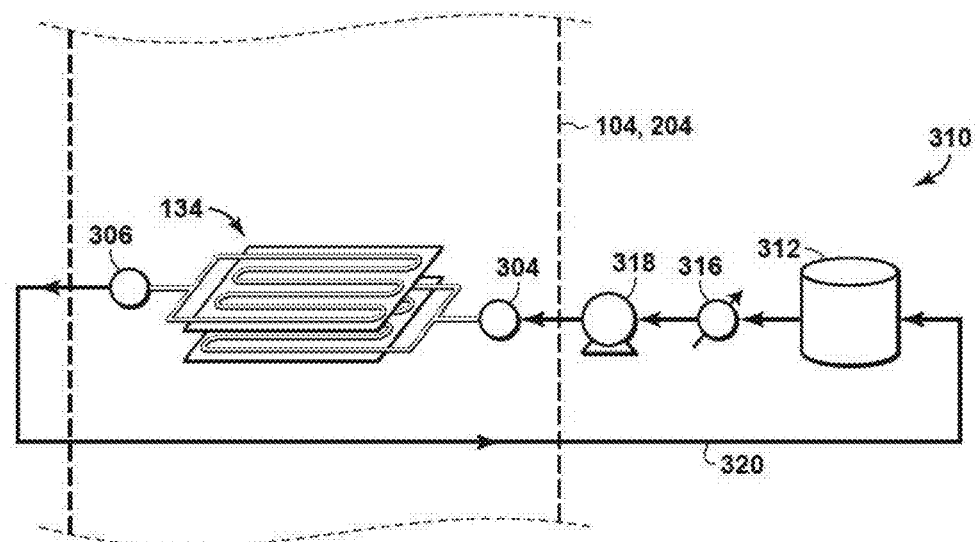
FIG. 17 is a schematic diagram of a heat exchanger sub-system.

FIG. 17 shows a heat exchanger sub-system 310 usable with distillation tower 104, 204. The heating medium is stored in a storage vessel 312. The inlet line is connected to a heater 316, which heats the heating medium to a desired temperature. The desired temperature may be a melt temperature of the solid, and/or a melt temperature of one solid selected from a plurality of solids in the middle controlled freeze zone section 108. In such embodiments, the desired temperature may be controlled (e.g., by controlling the temperature of the heating medium) such that the selected solid at least partially melts and the at least one of the plurality of solids does not. The heating medium is then directed to a pump 318 and finally to the inlet manifold 304. As previously described, the inlet manifold directs the heating medium into the tubing 302 of the heat exchange mechanism 134, 230, 234, 334 to melt the accumulated solids and/or selected solid(s) as desired, and the heating medium exits the tubing through the outlet manifold 306. The heating medium travels back to the storage vessel 312 via a return line 320. It is to be understood that the precise arrangement of storage vessel 312, heater 316, pump 318, and heat exchange mechanism 134 may be varied as desired. Further, design considerations may necessitate not using one or more elements of the heat exchanger sub-system 310, such as storage vessel 312.

The heat exchange mechanisms 134, 230, 234, 334 have several advantages over known tube coil heat exchangers. The coil-in-plate heat exchange mechanisms 134, 230, 234, 334 allow for more tubing to be deployed within the same spacing. Additionally, as the tubing is an integral part of the plate from which they are formed, the entire structure of the heat exchange mechanism assumes the temperature profile of the passages, increasing the effective surface area available for heat transfer to the accumulated solids.

Returning to a description of FIGS. 3-7, the liquid 130 in the melt tray assembly is heated by the vapor stream. The liquid 130 may also be heated by the one or more heat exchange mechanisms 134. The liquid 130 helps melt the solids formed in the middle controlled freeze zone section 108 into a liquid and/or slurry mix. Specifically, the heat transferred by the vapor stream heats up the liquid, thereby enabling the heat to melt the solids. The liquid 130 is at a level sufficient to melt the solids.

The middle controlled freeze zone section 108 may also comprise a spray assembly 129. The spray assembly 129 cools the vapor stream that rises from the lower section 40. The spray assembly 129 sprays liquid, which is cooler than the vapor stream, on the vapor stream to cool the vapor stream. The spray assembly 129 is within the upper section 39. The spray assembly 129 is not within the lower section 40. The spray assembly 129 is above the melt tray assembly 139. In other words, the melt tray assembly 139 is below the spray assembly 129.

The temperature in the middle controlled freeze zone section 108 cools down as the vapor stream travels from the bottom of the middle controlled freeze zone section 108 to the top of the middle controlled freeze zone section 108. The methane in the vapor stream rises from the middle controlled freeze zone section 108 to the upper section 110. Some contaminants may remain in the methane and also rise. The contaminants in the vapor stream tend to condense or solidify with the colder temperatures and fall to the bottom of the middle controlled freeze zone section 108.

The solids form the liquid and/or slurry mix when in the liquid 130. The liquid and/or slurry mix flows from the bottom of the middle controlled freeze zone section 108 to the top of the lower distillation section 106 via a line 22 (FIGS. 3-6). The line 22 may be an exterior line that extends from the middle controlled freeze zone section 108 to the lower section 106.

The vapor stream that rises in the middle controlled freeze zone section 108 and does not form solids or otherwise fall to the bottom of the middle controlled freeze zone section 108, rises to the upper section 110. The upper section 110 operates at a temperature and pressure and contaminant concentration at which no solid forms. The upper section 110 is constructed and arranged to cool the vapor stream to separate the methane from the contaminants. Reflux in the upper section 110 cools the vapor stream. The reflux is introduced into the upper section 110 via line 18.

After contacting the reflux in the upper section 110, the feed stream forms a vapor stream and a liquid stream. The vapor stream mainly comprises methane. The liquid stream comprises relatively more contaminants. The vapor stream rises in the upper section 110 and the liquid falls to a bottom of the upper section 110.

To facilitate separation of the methane from the contaminants when the stream contacts the reflux, the upper section 110 may include one or more mass transfer devices 176. Each mass transfer device 176 helps separate the methane from the contaminants. Each mass transfer device 176 may comprise any suitable separation device, such as a tray with perforations, or a section of random or structured packing to facilitate contact of the vapor and liquid phases.

After rising, the vapor stream may exit the distillation tower 104, 204 through line 14. The line 14 may extend from an upper part of the upper section 110. From line 14, the vapor stream may enter a condenser 122. The condenser 122 cools the vapor stream to form a cooled stream. The condenser 122 at least partially condenses the stream. After exiting the condenser 122, the cooled stream may enter a separator 124. The separator 124 separates the vapor stream into liquid and vapor streams. The separator may be any suitable separator that can separate a stream into liquid and vapor streams, such as a reflux drum.

Once separated, the vapor stream may exit the separator 124 as sales product. The sales product may travel through line 16 for subsequent sale to a pipeline and/or condensation to be liquefied natural gas.

Once separated, the liquid stream may return to the upper section 110 through line 18 as the reflux. The reflux may travel to the upper section 110 via any suitable mechanism, such as a reflux pump 150 (FIGS. 3 and 5) or gravity (FIGS. 4 and 6).

The liquid stream (i.e., freezing zone liquid stream) that falls to the bottom of the upper section 110 collects at the bottom of the upper section 110. The liquid may collect on tray 183 (FIGS. 3 and 5) or at the bottommost portion of the upper section 110 (FIGS. 4 and 6). The collected liquid may exit the distillation tower 104, 204 through line 20 (FIGS. 3 and 5) or outlet 260 (FIGS. 4 and 6). The line 20 may emanate from the upper section 110. The line 20 may emanate from a bottom end of the upper section 110. The line 20 may extend from an outer surface of the upper section 110.

The line 20 and/or outlet 260 may directly or indirectly (FIGS. 3-6) connect to the line 41. When the line 20 and/or outlet 260 directly connect to the line 41, the liquid spray may be pumped to the spray nozzle(s) 120 via any suitable mechanism, such as the spray pump 128 or gravity. When the line 20 and/or outlet 260 indirectly connect to the line 41, the lines 20, 41 and/or outlet 260 and line 41 may directly connect to a holding vessel 126 (FIGS. 3 and 5). The holding vessel 126 may house at least some of the liquid spray before it is sprayed by the nozzle(s). The liquid spray may be pumped from the holding vessel 126 to the spray nozzle(s) 120 via any suitable mechanism, such as the spray pump 128 (FIGS. 3-6) or gravity. The holding vessel 126 may be needed when there is not a sufficient amount of liquid stream at the bottom of the upper section 110 to feed the spray nozzles 120.

Figure 18:
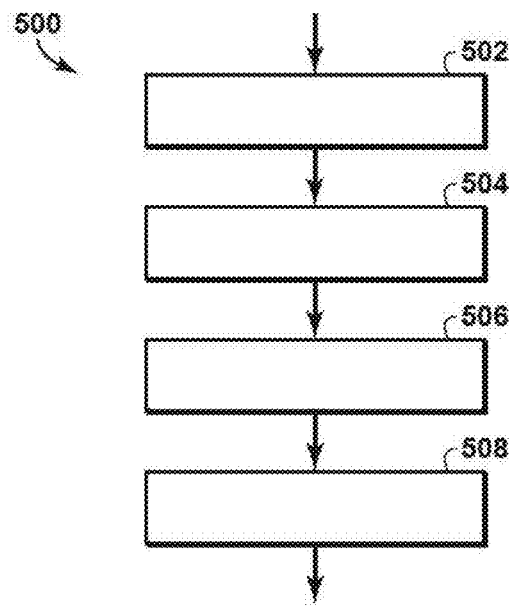
FIG. 18 is a block diagram of a method according to the disclosure.

FIG. 18 is a flowchart showing a method 500 for separating a feed stream in a distillation tower. At block 502 a controlled freeze zone section is maintained in the distillation tower. The controlled freeze zone section receives a freezing zone liquid stream to form a solid and a hydrocarbon-enriched vapor stream in the controlled feed zone section. At block 504 the solids are selectively melted using a heat exchange mechanism. The heat exchange mechanism includes at least one plate positioned where the solids form within the tower. Hollow tubing forms an integral part of each of the at least one plate. A heating medium selectively flows through the hollow tubing at a higher temperature than the solids to at least partially melt the solids. At block 506 the solid that has been at least partially melted by the heat exchange mechanism is collected. At block 508 the at least partially melted solid is disposed of in a manner that separates said at least partially melted solid from the hydrocarbon-enriched vapor stream.

Figure 19:
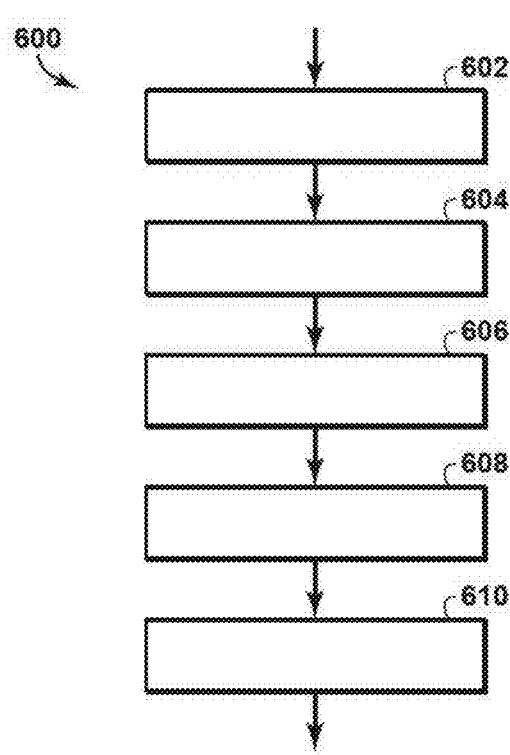
FIG. 19 is a block diagram of another method according to the disclosure.

FIG. 19 is a flowchart showing a method 600 for producing hydrocarbons. At block 602 a controlled freeze zone section is maintained in the distillation tower. The controlled freeze zone section receives a freezing zone liquid stream to form a solid and a hydrocarbon-enriched vapor stream in the controlled feed zone section. At block 604 the solids are selectively melted using a heat exchange mechanism. The heat exchange mechanism includes at least one plate positioned where the solids form within the tower. Hollow tubing forms an integral part of each of the at least one plate. A heating medium selectively flows through the hollow tubing at a higher temperature than the solids to at least partially melt the solids. At block 606 the solid that has been at least partially melted by the heat exchange mechanism is collected. At block 608 the at least partially melted solid is disposed of in a manner that separates said at least partially melted solid from the hydrocarbon-enriched vapor stream. At block 610 a hydrocarbon-enriched vapor stream extracted from the distillation tower is produced.

The steps depicted in FIGS. 18 and 19 are provided for illustrative purposes only and a particular step may not be required to perform the inventive methodology. Moreover, FIGS. 18 and 19 may not illustrate all the steps that may be performed. The claims, and only the claims, define the inventive system and methodology.

Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. The disclosed methodologies and techniques may be used in extracting hydrocarbons from a subsurface region and processing the hydrocarbons. Hydrocarbons and contaminants may be extracted from a reservoir and processed. The hydrocarbons and contaminants may be processed, for example, in the distillation tower previously described. After the hydrocarbons and contaminants are processed, the hydrocarbons may be extracted from the processor, such as the distillation tower, and produced. The contaminants may be disposed of or discharged as deemed proper. For example, as shown in FIG. 18, the method for producing hydrocarbons may include producing the hydrocarbon-enriched vapor stream extracted from the distillation tower. The method may also include removing the hydrocarbon-enriched vapor stream from the distillation tower before producing the hydrocarbon-enriched vapor stream. The initial hydrocarbon extraction from the reservoir may be accomplished by drilling a well using hydrocarbon drilling equipment. The equipment and techniques used to drill a well and/or extract these hydrocarbons are well known by those skilled in the relevant art. Other hydrocarbon extraction activities and, more generally, other hydrocarbon management activities, may be performed according to known principles.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure. Furthermore, the articles "the," "a" and "an" are not necessarily limited to mean only one, but rather are inclusive and open ended so as to include, optionally, multiple such elements.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A method for separating a feed stream in a distillation tower comprising:
    maintaining a controlled freeze zone section in the distillation tower, wherein the controlled freeze zone section is constructed and arranged to form a plurality of solids and a hydrocarbon-enriched vapor stream from the feed stream;
    maintaining a melt tray assembly within the controlled freeze zone section, wherein the melt tray assembly is constructed and arranged to at least partially melt the solids that are formed in the controlled freeze zone section, and wherein the melt tray assembly comprises a heat exchange mechanism comprising a plurality of plates having one or more hollow tubings forming an integral part of the plates, and further wherein the heat exchange mechanism comprises a plurality of passages through at least one of the plurality of plates, said passages allowing equilibration of liquid surrounding the at least one plate;
    at least partially melting the solids using the heat exchange mechanism by flowing a heating medium through the one or more hollow tubings that are integrally disposed in the plates of the heat exchange mechanism, wherein the heating medium is at a higher temperature than the temperature of the solid;
    collecting the solid that has been at least partially melted by the heat exchange mechanism; and
    separating the at least partially melted solid from the hydrocarbon-enriched vapor stream.

2. The method of claim 1, further comprising:
    selecting the solid from a plurality of solids in the controlled freeze zone, wherein at least one of the plurality of solids has a different melting temperature than the melting temperature of the selected solid; and
    controlling the higher temperature such that the selected solid at least partially melts and the at least one of the plurality of solids does not.

3. The method of claim 1, wherein the heat exchange mechanism comprises a plurality of individual, interconnected heat-exchangers, each of the plurality of individual, interconnected heat-exchangers including a portion of the plurality of plates.

4. The method of claim 3, wherein the plurality of heat-exchangers are arranged in a substantially parallel, coiled, or serpentine configuration.

5. The method of claim 1, wherein the melt tray assembly further comprises a plurality of vapor risers, and wherein at least partially melting the solids further comprises passing vapor through at least one of the plurality of vapor risers.

6. The method of claim 1, wherein at least one of the plurality of plates is substantially rectangular in shape.

7. The method of claim 1, wherein at least one of the plurality of plates is conical in shape.

8. The method of claim 1, wherein at least one of the plurality of plates is frusto-conical in shape.

9. The method of claim 1, wherein the plurality of plates are concentrically arranged, with each of the plurality of plates having a different radius of curvature.

10. The method of claim 1, wherein the at least one of the plurality of plates is formed in a spiral.

11. The method of claim 1, wherein the plurality of plates comprises a plurality of interconnected sets of plates.

12. The method of claim 1, wherein at least one of the plurality of plates is disposed to accommodate passage of at least one vapor riser adjacent thereto.

13. The method of claim 12, wherein the at least one vapor riser comprises a plurality of vapor risers, at least one of the plurality of vapor risers having a length different from a length of another of the at least one of the plurality of vapor risers.

14. The heat method of claim 12, wherein the at least one vapor riser has an interior, and further comprising an irregular texture or shape in the interior of the vapor riser.

15. The method of claim 1, wherein a surface of at least one of the plurality of plates is textured for enhanced for heat transfer performance.

16. The method of claim 1, wherein an inner surface of the hollow tubing is textured.

17. The method of claim 1, wherein at least one of the one or more hollow tubings has an orientation of one or more of circumferential, radial, angled, parallel to a diameter of the distillation tower, and perpendicular to the diameter of the distillation tower.

* * * * *